United States Patent [19]
Sturm, Jr. et al.

[11] Patent Number: 5,762,467
[45] Date of Patent: Jun. 9, 1998

[54] UNDERGROUND STORAGE TANK MANIPULATOR

[75] Inventors: Albert J. Sturm, Jr., Stillwater; Fred W. Hanson, White Bear Lake; Mark W. Benoit, Cedar; Thomas E. Marrinan, Minneapolis, all of Minn.

[73] Assignee: Par Systems, Inc., Shoreview, Minn.

[21] Appl. No.: 639,216

[22] Filed: Apr. 26, 1996

[51] Int. Cl.$^6$ ............................................. B66C 6/00
[52] U.S. Cl. ............................. 414/729; 414/718; 414/8; 212/300
[58] Field of Search ............................ 414/1, 2, 3, 8, 414/718, 729; 165/11.2; 212/300

[56] References Cited

U.S. PATENT DOCUMENTS

| | | | |
|---|---|---|---|
| 3,214,033 | 10/1965 | Nilsson | 212/55 |
| 3,247,978 | 4/1966 | Neumeier | 214/1 |
| 3,247,979 | 4/1966 | Melton et al. | 414/728 X |
| 3,419,158 | 12/1968 | Lemelson | 414/728 |
| 3,481,490 | 12/1969 | Eiler | 212/55 |
| 3,482,711 | 12/1969 | Bohme et al. | 414/728 X |
| 3,708,937 | 1/1973 | Sterner | 52/118 |
| 3,736,710 | 6/1973 | Sterner | 52/115 |
| 3,837,502 | 9/1974 | Hornagold | 212/55 |
| 3,840,128 | 10/1974 | Swoboda, Jr. et al. | 214/1 BD |
| 3,985,234 | 10/1976 | Jouffray | 212/144 |
| 4,004,695 | 1/1977 | Hockensmith et al. | 212/144 |
| 4,016,688 | 4/1977 | Tiffin et al. | 52/118 |
| 4,171,597 | 10/1979 | Lester et al. | 52/118 |
| 4,327,533 | 5/1982 | Sterner | 52/115 |
| 4,459,786 | 7/1984 | Pitman et al. | 52/115 |
| 4,501,522 | 2/1985 | Causer et al. | 414/718 X |
| 4,523,884 | 6/1985 | Clement et al. | 414/8 |
| 4,534,006 | 8/1985 | Minucciani et al. | 364/513 |
| 4,547,119 | 10/1985 | Chance et al. | 414/735 |
| 4,782,713 | 11/1988 | Torii et al. | 74/89.15 |
| 5,314,083 | 5/1994 | Wiggershaus et al. | 212/213 |
| 5,465,854 | 11/1995 | Sturm et al. | 212/319 |

FOREIGN PATENT DOCUMENTS

| | | | |
|---|---|---|---|
| 392926 | 10/1990 | European Pat. Off. | 414/728 |
| 2307756 | 11/1976 | France . | |
| 2642059 | 7/1990 | France . | |
| 1025659 | 6/1983 | U.S.S.R. . | |
| 970441 | 9/1964 | United Kingdom . | |
| 2128957 | 5/1984 | United Kingdom . | |

OTHER PUBLICATIONS

Radioactive Tank Waste Remediation Focus Area, "Technology Summary", *Office of Environmental Management Technology Development*, Jun., 1995, pp. i–ii and 4–6.

*Primary Examiner*—Donald W. Underwood
*Attorney, Agent, or Firm*—Westman, Champlin & Kelly, P.A.; S. Koehler

[57] ABSTRACT

A manipulator system includes an elongated mast having a mast axis and a telescoping tube assembly having a tube axis. The telescoping tube assembly includes an outer tube section and at least one inner tube section that only moves telescopically with respect to the outer tube section. The telescoping tube assembly is joined to an end of the elongated mast for only pivotal movement. An actuator joined to the elongated mast and the outer tube section pivots the telescoping tube assembly from a first position, wherein the tube axis is parallel to the mast axis and the telescoping tube assembly is retracted, to a second position, wherein the tube axis is perpendicular to the mast axis and the inner tube section is deployable. An end effector is joined to a remote end of the inner tube section to perform work within the tank.

8 Claims, 10 Drawing Sheets

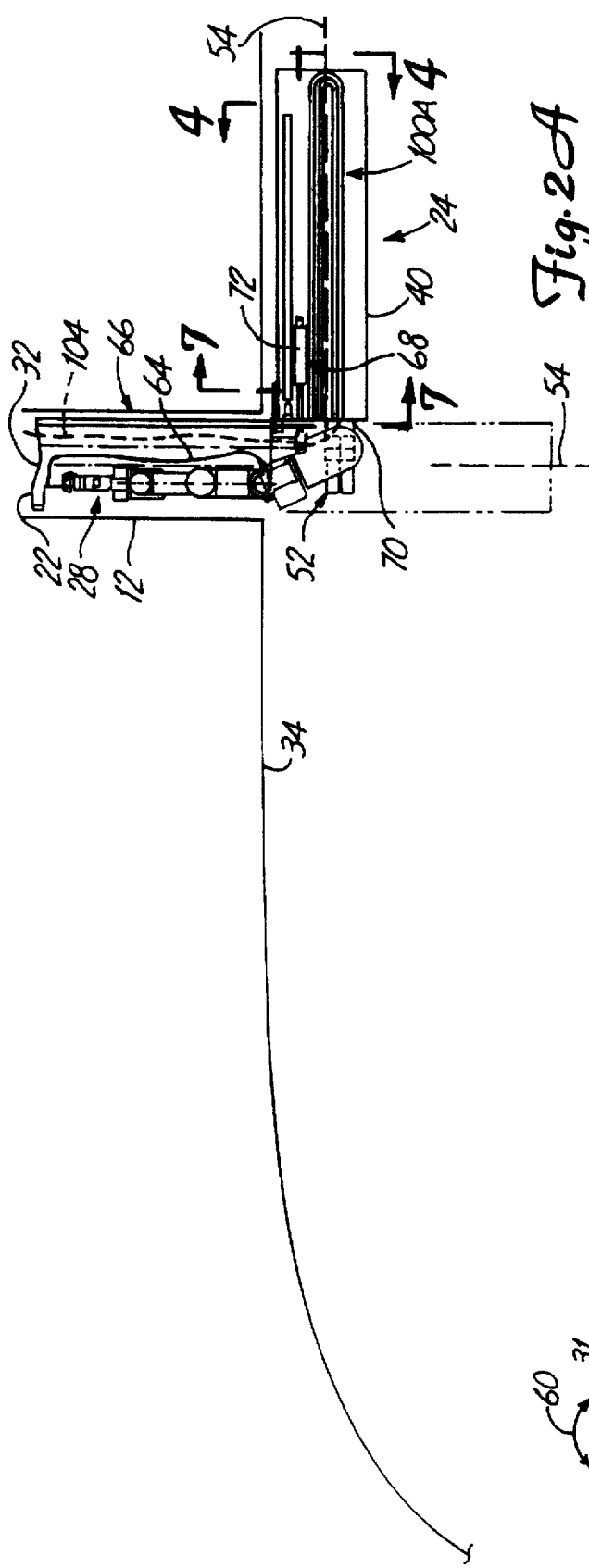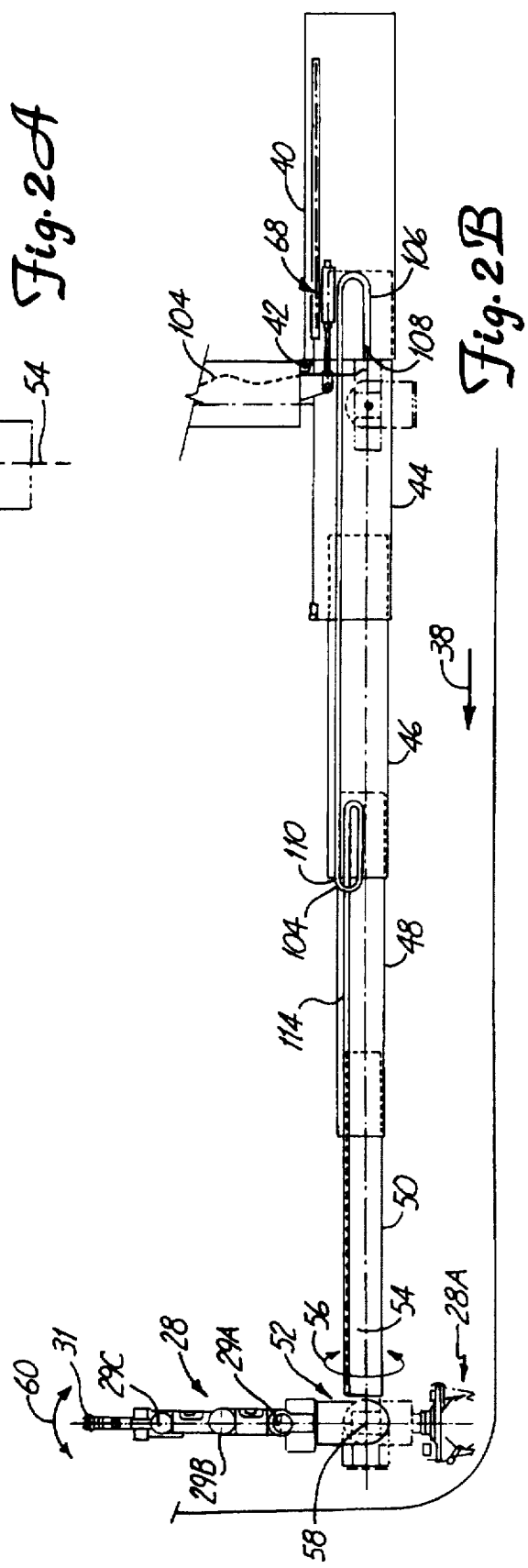

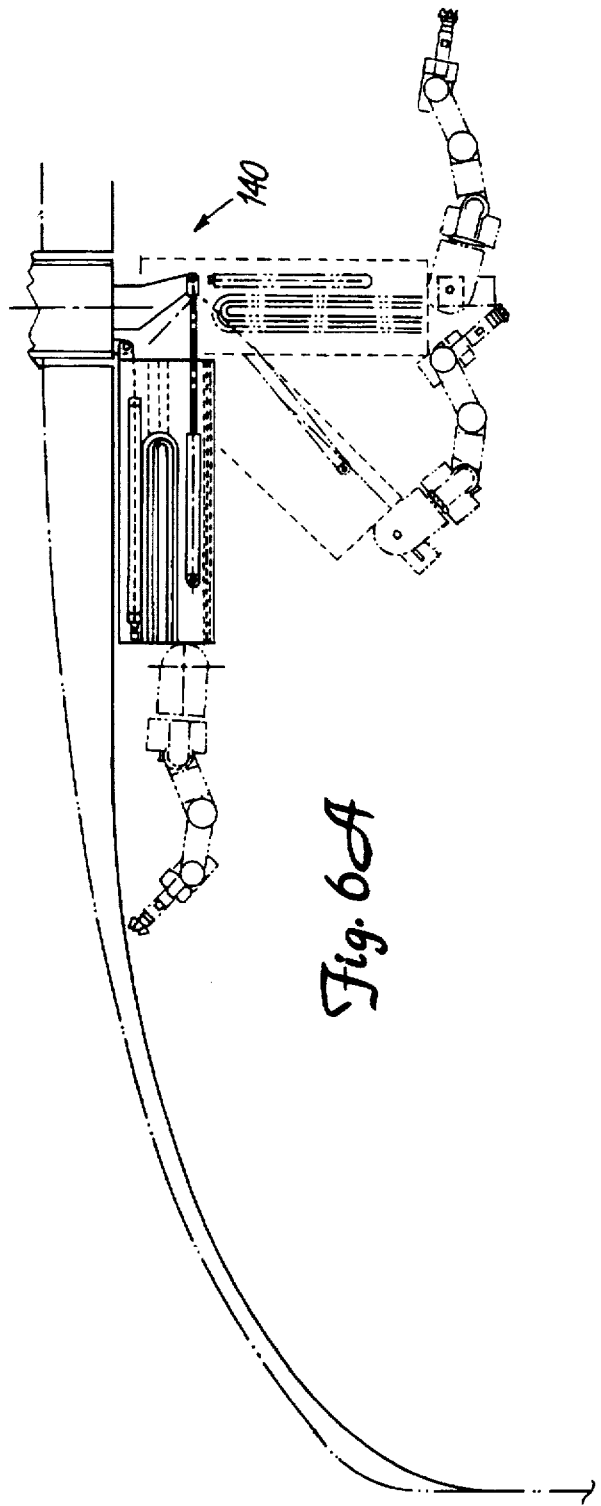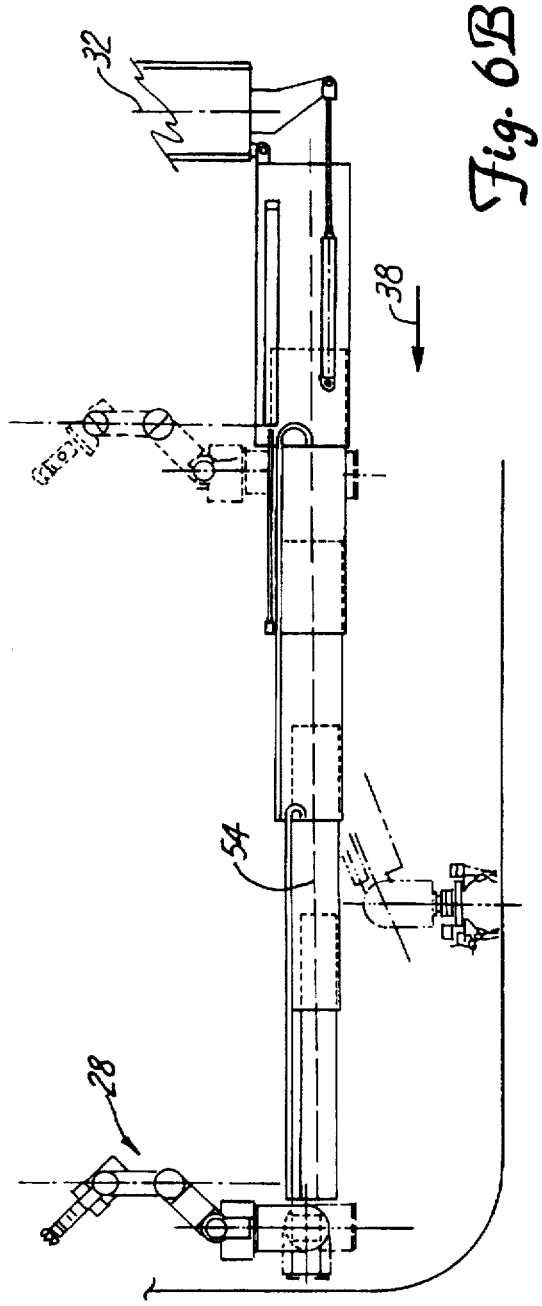

UNDERGROUND STORAGE TANK MANIPULATOR

BACKGROUND OF THE INVENTION

The present invention relates to manipulators used in underground storage tanks. More particularly, the present invention relates to a compact underground storage tank manipulator that can be deployed through existing risers.

Underground storage tanks are used throughout industry for storage of waste products. The tanks are large in volume and can easily approach 75 feet in diameter and 45 feet in depth. A central riser or opening having a diameter of approximately 3 feet allows access into the tank. Additional risers are disposed at various positions about the central riser. The additional risers are typically much smaller than the central riser and provide vents or other approaches into the tank for monitoring and test purposes.

There is an ongoing need to develop a manipulator that can be inserted through the central riser and which can reach all portions of the tank. One prior art system includes multiple, serial-linked arms. The arms are pivotally joined together and have actuators operably coupled between successive arms. By operating the actuators, the arms can be extended in a linear direction, or bent, as required to reach other portions of the tank. However, the additional risers present in the tank form obstacles when the arms are manipulated in order to reach some portions of the tank.

SUMMARY OF THE INVENTION

A manipulator system includes an elongated mast having a mast axis and a telescoping tube assembly having a tube axis. The telescoping tube assembly includes an outer tube section and at least one inner tube section that only moves telescopically with respect to the outer tube section. The telescoping tube assembly is joined to an end of the elongated mast for only pivotal movement. An actuator joined to the elongated mast and the outer tube section pivots the telescoping tube assembly from a first position, wherein the tube axis is parallel to the mast axis and the telescoping tube assembly is retracted, to a second position, wherein the tube axis is perpendicular to the mast axis and the inner tube section is deployable. An end effector is joined to a remote end of the inner tube section to perform work within the tank.

By joining the telescoping tube assembly for only pivotal movement relative to the mast and allowing only translational telescoping movement of the inner tube section relative to the outer tube section, the manipulator system can be easily deployed and can reach the side walls of the enclosure from the central riser. In a preferred embodiment, a rotary actuator couples the end effector to the remote end of the inner tube section and allows the end effector to work around any additional risers that may be present within the tank.

BRIEF DESCRIPTION OF THE DRAWINGS

FIG. 2A is a side elevational view of the manipulator system entering the underground storage tank.

FIG. 2B is an enlarged side elevational view of the manipulator system extended within the underground storage tank.

FIG. 6A is a side elevational view of a second embodiment of the manipulator system of the present invention being inserted in the underground storage tank.

FIG. 6B is a side elevational view of the second embodiment of the manipulator system.

DETAILED DESCRIPTION OF THE PREFERRED EMBODIMENTS

Figure 1:
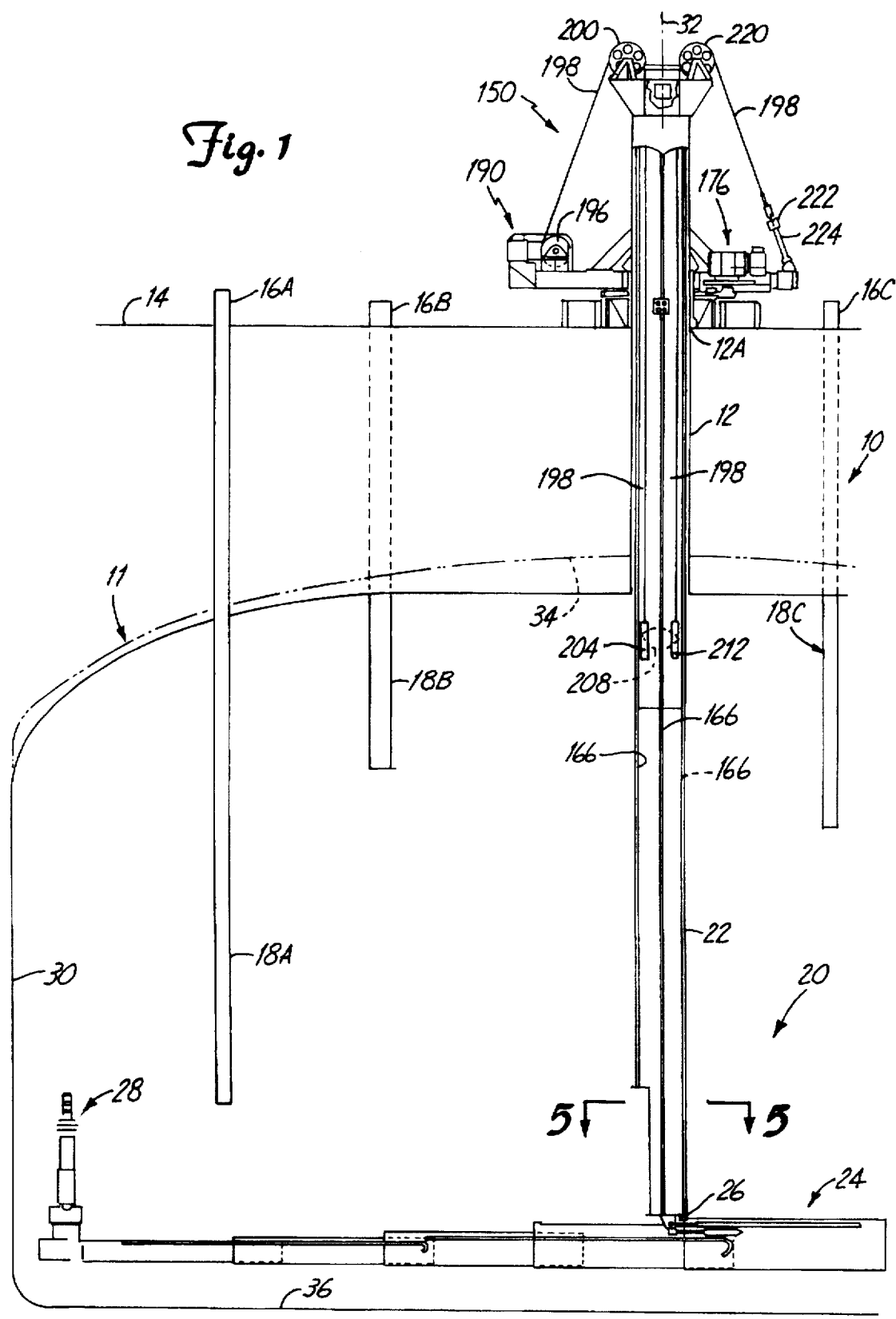
FIG. 1 is a side elevational view of a manipulator system of the present invention extended within an underground storage tank.

FIG. 1 illustrates an underground storage tank 10 for storing waste products. The tank 10 includes a large underground enclosure 11, typically cylindrical, and a riser or pipe 12 centrally disposed and extending upward from the enclosure 11 to a ground surface indicated at 14. The tank 10 can include other risers or pipes indicated at 16A, 16B and 16C that extend from the ground surface 14 into the enclosure 11 having extensions 18A, 18B and 18C of varying depths within the enclosure 11. The risers 16A–16C are disposed at various positions from the central riser 12. The risers 16A–16C are typically much smaller than the central riser 12 and provide vents and other approaches into the tank 10 for monitoring and test purposes.

A manipulator system 20 of the present invention is insertable through the central riser 12 to perform work within the enclosure 11. Generally, the manipulator system 20 includes a mast 22 and a telescoping tube assembly 24 pivotally joined to the mast 22 on an end 26. As will be described below, the unique combination of the mast 22 and the telescoping tube assembly 24 provides an efficient and accurate assembly for positioning an end effector 28, such as a dexterous manipulator herein illustrated, anywhere within the enclosure 11. In particular, the manipulator system 20 can reach all portions of an inner tank wall 30, working around the extensions 18A–18C that may exist within the enclosure 11. The enclosure 11 can easily extend 37 feet in radius from a central axis 32 of the central riser 12, and have a depth of 45 feet from an upper wall 34 to a bottom wall 36. The manipulator system 20 can work within the large volume of the enclosure 11, yet can be inserted and then retrieved through the central riser 12, which is small, for example, 38 inches in diameter.

Referring to FIGS. 2A and 2B, the telescoping tube assembly 24 is pivotally joined to the end 26 of the mast 22 so as to pivot away from the axis 32 and away from the direction of deployment of the telescoping tube assembly 24 indicated by arrow 38 in FIG. 2B. In the embodiment illustrated, the telescoping tube assembly 24 includes an outer tube section 40 pivotally joined to the mast 22 with a hinge 42. At least one, and preferably a plurality of movable inner tube sections indicated at 44, 46, 48 and 50, telescope with respect to each other and the outer tube section 40. The end effector 28 mounts to a distal end of the last inner tube section 50 with a rotary actuator 52 that allows the end effector 28 to rotate about a tube axis 54 (indicated by double arrow 56) as well as rotate about an axis 58 perpendicular to the axis 54 (indicated by double arrow 60). The end effector 28 can include additional joints such as illustrated at 29A, 29B and 29C to allow a tool 31 to be positioned, as desired. By joining the telescoping tube assembly 24 for only pivotal movement relative to the mast 22 and allowing only translational telescoping movement of the inner tube sections 44, 46, 48 and 50, the manipulator system 20 can be easily deployed and reach the wall 30 of the enclosure 11. By further including the rotary actuator 52 that can rotate the end effector 28 about the tube axis 54, the tool 31 can reach around any of the riser extensions 18A–18C that may be in the way. Although illustrated wherein the telescoping tube assembly 24 has four inner tube sections, it should be understood that the telescoping tube assembly 24 can have any number of inner telescoping tube sections, with a minimum of one inner tube section.

Deployment of the telescoping tube assembly 24 is illustrated in FIGS. 2A and 2B. With the telescoping tube assembly 24 positioned as indicated in dashed lines wherein the tube axis 54 is parallel to the central axis 32, the mast 22 lowers the telescoping tube assembly 24 into the enclosure 11 past the upper wall 34. At this point, the telescoping tube assembly 24 can be pivoted such that the tube axis 54 is substantially perpendicular to the central axis 32 with actuators 68 having rods 70 joined to the mast 22 and a cylinder 72 joined to tube section 40. In the embodiment illustrated, the end effector 28 is stored within the mast 22 in a direction away from the enclosure 11. During pivotal movement of the telescoping tube assembly 24, the rotary actuator 52 is counter rotated so as to prevent contact of the end effector 28 with the inner wall of the central riser 12. After the telescoping tube assembly 24 has been pivoted, the mast 22 can be lowered so that the end effector 28 clears the inner wall of the central riser 12. An end 66 of the mast 22 includes a longitudinal opening 64 that opens in a direction of deployment (indicated by arrow 38) of the inner tube sections 44, 46, 48 and 50. The end effector 28 exits the mast 22 through the longitudinal opening 64 with operation of the actuator 52 or telescoping movement of the inner tube sections 44, 46, 48 and 50.

It should be understood that if the telescoping tube assembly 24 can be lowered to a position such that the end effector 28 clears the inner wall of the central riser 12, the telescoping tube assembly 24 can be pivoted to a position where the tube axis 54 is perpendicular to the central axis 32 and the end effector 28 exits the mast 22 without operation of the rotatory actuator 52.

The telescoping tube assembly 24 is hinged upon the mast 22 to allow easy access to all portions of the enclosure 11. Specifically, the hinge 42 is located such that the inner tube sections 44, 46, 48 and 50 collapse into the outer tube section 40 so as to position the distal end of the inner tube section 50 proximate the axis 32. In this manner, the end effector 28 can easily reach from the central axis 32 to the outer side wall 30 with only telescopic movement of the inner tube sections. Furthermore, positioning of the end effector 28 within the mast 22 as illustrated in FIG. 2A allows the end effector 28 to be changed when desired without removing the telescoping tube assembly 24 from the central riser 12. For example, the end effector 28 can be replaced with a parallel jaw assembly indicated at 28A in FIG. 2B.

Retraction of the manipulator system 20 from the enclosure 11 is performed opposite to that of deployment. The inner tube sections 44, 46, 48 and 50 are retracted into the outer tube section 40 so as to position the distal end of the inner tube section 50 proximate the axis 32 of the mast 22.

After the end effector 28 is received through the opening 64 and into the end portion 66 of the mast 22, actuators 68 rotate the telescoping tube assembly 24 to the position indicated with dashed lines in FIG. 2A to be in line with the mast 22. The rotary actuator 52 counter rotates the end effector 28 during pivotal movement of the telescoping tube assembly 24 in order to maintain the end effector 28 within the mast 22. The additional joints 29A–29C of the end effector 28 can also be rotated as required to keep the end effector 28 within the mast 22.

Figure 3:
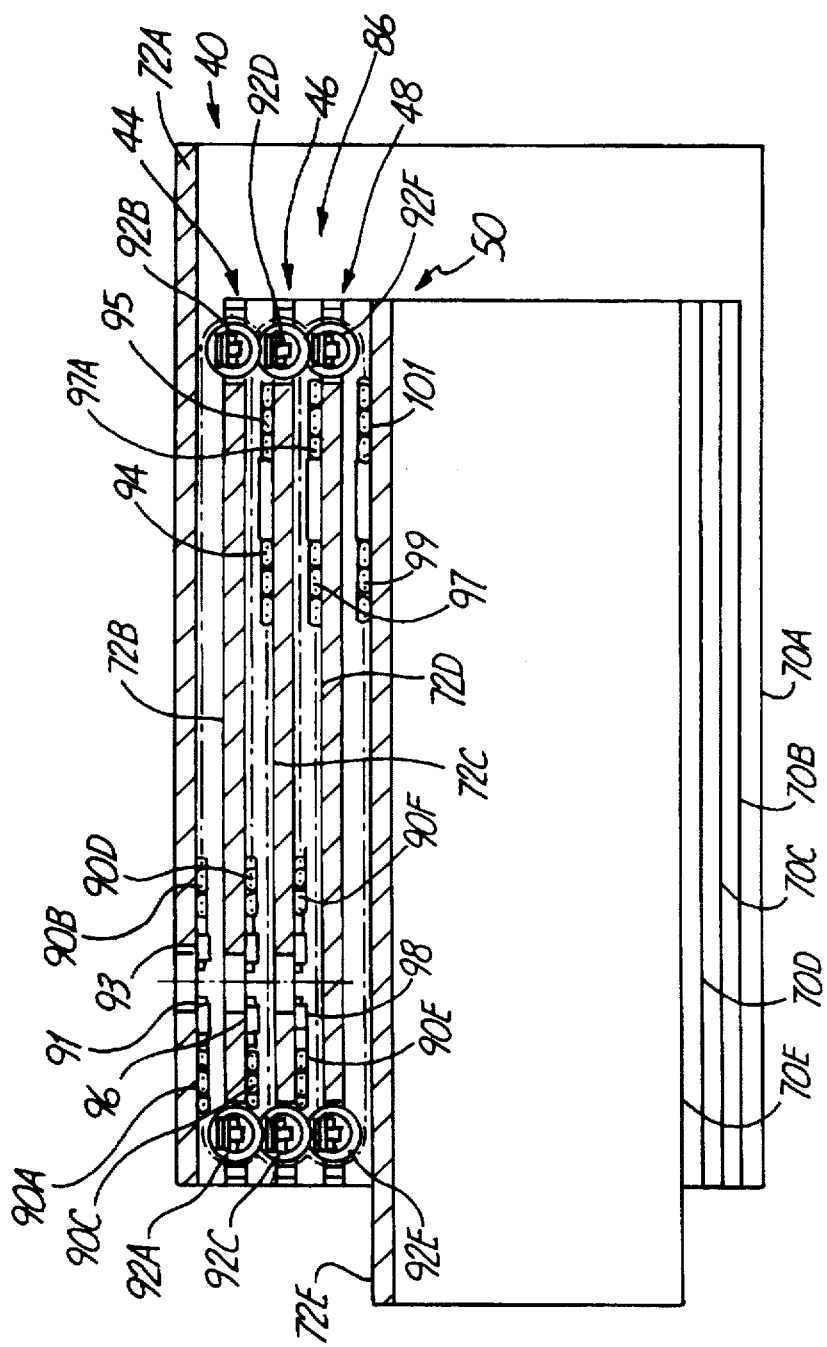
FIG. 3 is a sectional view of a retracted telescoping tube assembly.
Figure 4:
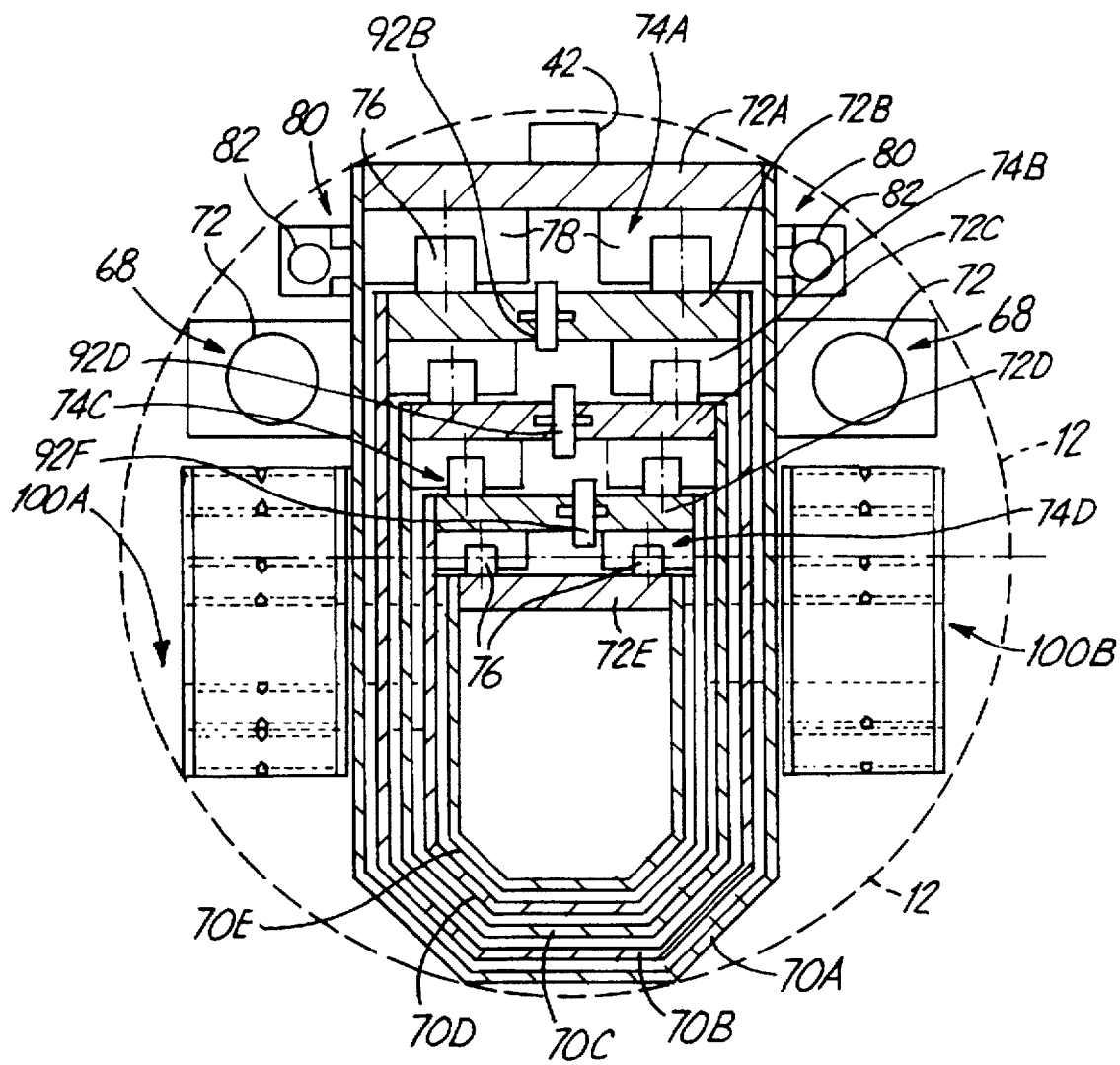
FIG. 4 is a sectional view taken along lines 4—4 in FIG. 2A.

The telescoping tube assembly 24 is disclosed in U.S. Pat. No. 5,465,854 and is hereby incorporated by reference. Structural rigidity of the telescoping tube assembly 24 is provided by the construction of each tube section 40, 44, 46, 48 and 50. Referring to FIGS. 3 and 4, each tube section 40, 44, 46, 48 and 50 includes a relatively thin U-shaped housing 70A, 70B, 70C, 70D and 70E joined to a thicker, more rigid, support plate 72A, 72B, 72C, 72D and 72E, respectively. The support plates 72A–72E, although sufficiently rigid for compressive loading, are inherently weak to torsion bending. The attachment of the thin housings 70A–70E to each respective support plate 72A–72E produces a more rigid structure by providing a load path for shear loads.

Figure 7:
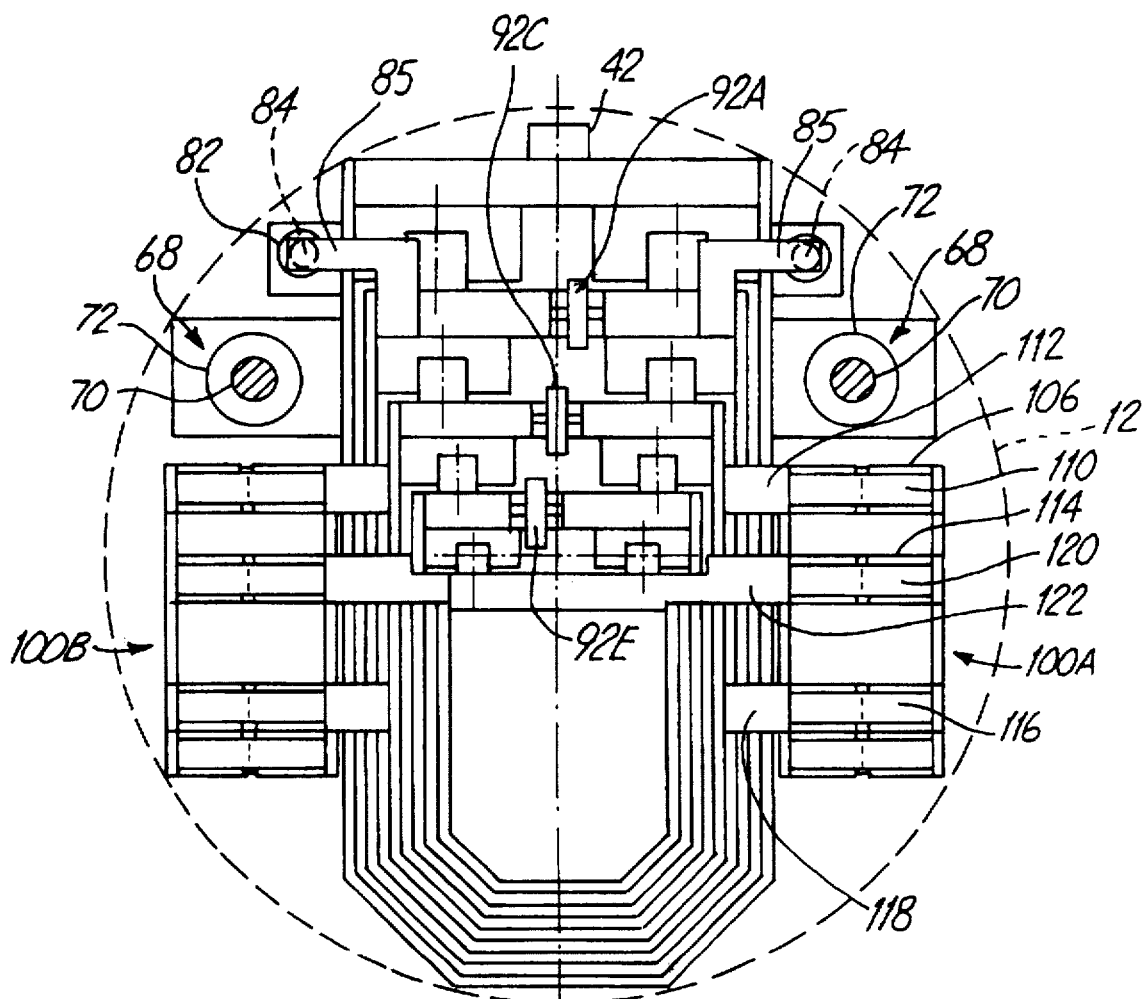
FIG. 7 is a sectional view taken along lines 7—7 in FIG. 2A.

Between each tube section 40, 44, 46, 48 and 50 are parallel linear bearing assemblies indicated at 74A, 74B, 74C and 74D. Each of the linear bearing assemblies 74A–74D includes a linear bearing track 76 attached to one of the support plates 72B–72E and linear bearings 78 attached to the support plates 72A–72D to engage the linear bearing tracks 76. By making contact only with the rigid support plates 72A–72E and not about the perimeter of each tube section 40, 44, 46, 48 and 50, bulging of the U-shaped housings 70A–70E is eliminated. Preferably, the contacting portions of the linear bearings 78 are positioned proximate each other and, if possible, overlap each other as illustrated in FIGS. 4 and 7 so that substantially all of the forces are transferred through the rigid support plates 72B–72E of the movable tube sections 44, 46, 48 and 50 to the rigid support plate 72A of the outer tube section 40.

The tube sections 40, 44, 46, 48 and 50 are of equivalent length but of decreasing width and depth such that each tube section may retract and nest in the preceding tube section. Actuators 80, such as hydraulic actuators herein illustrated, are operably coupled between the outer tube section 40 and the inner tube section 44. Referring to FIGS. 2A, 4 and 7, hydraulic cylinders 82 are secured to the outer tube section 40 on opposite side surfaces, while rods 84 are coupled to a remote end of the inner tube section 44 with plates 85.

Referring to FIG. 3, a pulley system 86 is used to extend the tube sections 46, 48 and 50 simultaneously and with extension of the tube section 44 out of the tube section 40. The pulley system 86 includes a first chain 90A attached to the rigid support plate 72A at 91. The first chain 90A is guided by a pulley 92A disposed on the rigid support plate 72B and is joined on a remote end to the rigid support plate 72C at 94. A second chain 90B is also attached to the first support plate 72A at 93 but is guided by a pulley 92B disposed at an end of the rigid support plate 72B opposite the pulley 92A. The second chain 90B is secured to the rigid support plate 72C at 95. A third chain 90C is attached to the rigid support plate 72B at 96. The third chain 90C is guided by a pulley 92C disposed on the rigid support plate 72C and is joined on a remote end to the rigid support plate 72D at 97. A fourth chain 90D is also attached to the second support plate 72B but is guided by a pulley 92D disposed at an end of the rigid support plate 72C opposite the pulley 92C. The fourth chain 90D is secured to the rigid support plate 72D at 97A. A fifth chain 90E is attached to the rigid support plate 72C at 98. The fifth chain 90E is guided by a pulley 92E disposed on the rigid support plate 72D and is joined on a remote end to the rigid support plate 72E at 99. A sixth chain 90F is also attached to the support plate 72C but is guided by a pulley 92F disposed at an end of the rigid support plate 72D opposite the pulley 92E. The sixth chain 90F is secured to the rigid support plate 72E at 101. As the actuators 80 extend the tube section 44 away from the tube section 40, the chains 90A, 90C and 90E extend each of the other tube sections 46, 48 and 50. Likewise, as the actuators 80 retract the tube section 44 within the tube section 40, the chain 90B, 90D and 90F retract the tube sections 46, 48 and 50.

Packaging of the telescoping tube assembly 24 so that it will fit within the diameter of the central riser 12 is very important. In FIGS. 4 and 7, the diameter of the central riser 12 is indicated with a dashed circle. The telescoping tube assembly 24 must also extend as illustrated in FIG. 2B providing power (hydraulic, pneumatic or electrical) and other command signals to the end effector 28. In the embodiment illustrated, flexible conduit assemblies indicated at 100A and 100B extend and retract with the tube sections 44, 46, 48 and 50 to retain and protect the signal lines provided to the end effector 28. Referring to the flexible conduit assembly 101A by way of example as illustrated in FIGS. 2A and 2B, the signal lines are represented at 104 and extend down through the mast 22 and enter a first flexible conduit 106 at end 108. The signal lines 104 extend through the first flexible conduit 106 and exit through an opening 110. As illustrated in FIG. 7, the end of the first flexible conduit 106 is secured to the end of the tube section 46 with a bracket 112 to travel therewith. The signal lines 104 then enter a second flexible conduit 114 through an opening 116. The end of the second flexible conduit 114 having the opening 116 is also attached to the end of tube section 46 with a bracket 118. The signal lines 104 extend through the second flexible conduit 114 and exit proximate the end effector 28 through an opening 120. The second flexible conduit 114 is secured to the end of the tube section 50 with a bracket 122. With opposite ends of the first flexible conduit 106 joined only to the tube section 40 and to the movable tube section 46, while the ends of the second flexible conduit 114 are joined only to the ends of the tube section 46 and the tube section 50, the flexible conduits 106 and 114 and signal lines 104 contained therein do not bind, but rather, extend and retract with the telescoping tube assembly 24 as illustrated in FIGS. 2A and 2B. The flexible conduit assembly 100B is constructed similar to the flexible conduit assembly 100A. Location of the flexible conduit assemblies 100A and 100B, the actuators 68 and the actuators 80 on opposite sides of the telescoping tube assembly 24 efficiently uses the available space through the central riser 12.

FIGS. 6A and 6B illustrate a second embodiment of a manipulator system of the present invention at 140. The manipulator system 140 includes the telescoping tube assembly 24, the actuators 80, the pulley assembly system 86 and the flexible conduit assemblies 101A and 100B, described above. The telescoping tube assembly 24 and, in particular, the tube section 40, is pivotally joined to the mast 22 so as to pivot toward the direction of deployment indicated by the arrow 38. Referring also to FIG. 6A, the end effector 28 is mounted at a distal end of the telescoping tube assembly 24 and would enter the enclosure 11 before the retracted telescoping tube assembly 24. By varying the pivot angle formed between the axis 32 of the mast 22 and the axis 54 of the telescoping tube assembly 24, and by varying the extension of the telescoping tube assembly 24, the manipulator system 140 can reach substantially all portions of the enclosure 11. If necessary, the end effector 28 can have sufficient reach to fold back along the telescoping tube assembly 24 to reach portions of the upper wall 34 proximate the opening of the central riser 12.

Figure 8:
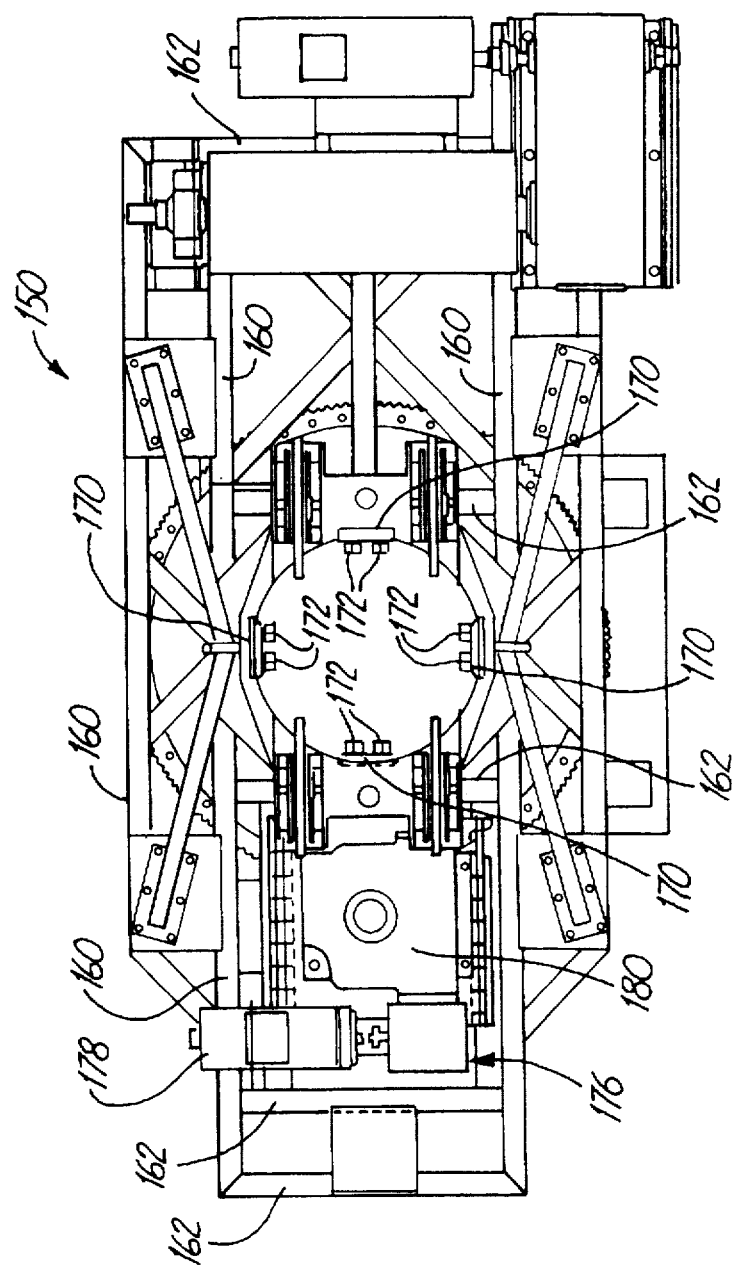
FIG. 8 is a top plan view of a mast lifting and rotating assembly.
Figure 9:
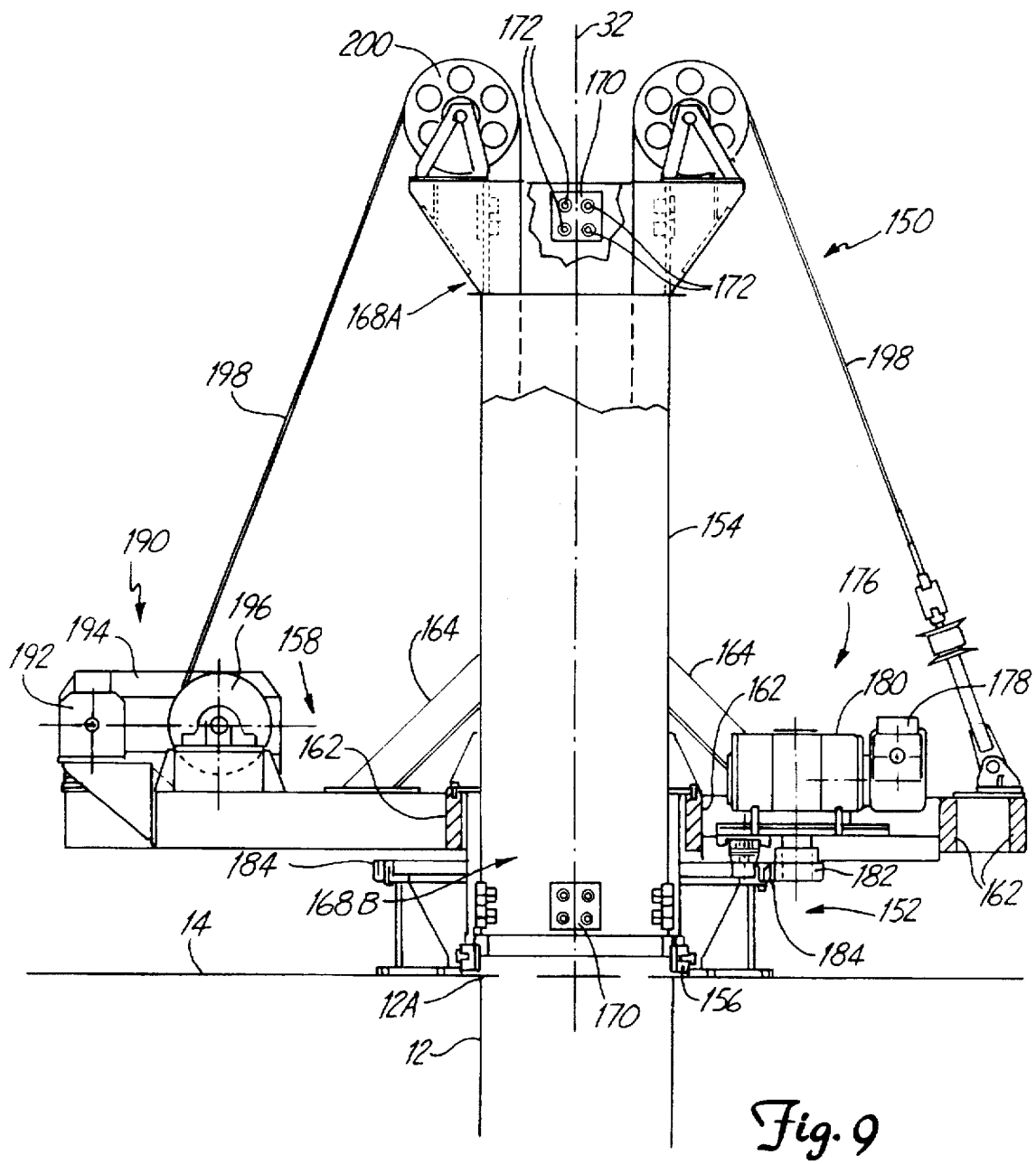
FIG. 9 is a sectional view of the mast lifting and rotating assembly with portions removed.

An assembly for lifting and rotating the mast 22 is illustrated in FIGS. 1, 8 and 9 at 150. The assembly 150 includes a fixed base 152 secured to the ground surface 14 about an opening 12A of the central riser 12. A support column 154 extends upwardly from the fixed base 152 and is supported on the fixed base 152 with a bearing 156. The bearing 156 allows the support column 154 to rotate about the axis 32.

Figure 5:
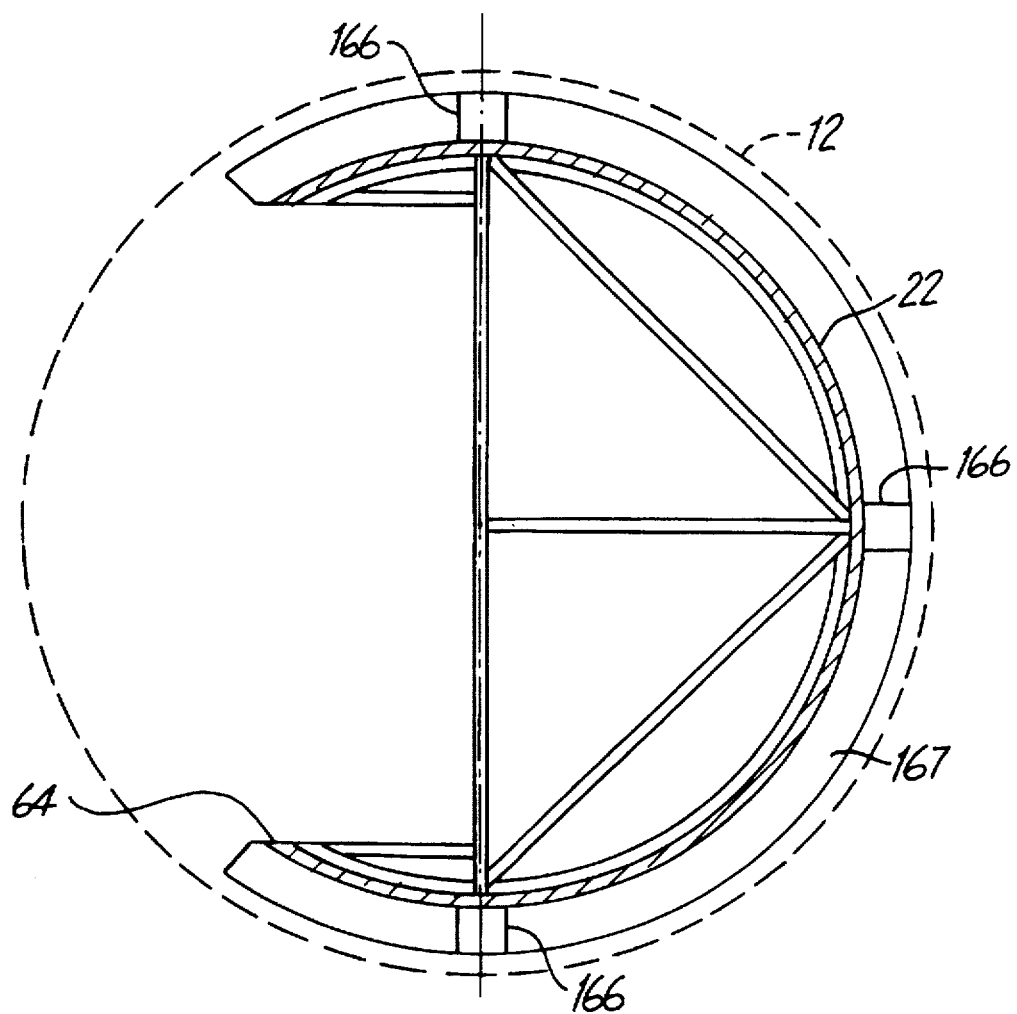
FIG. 5 is a sectional view of an end of the mast taken along lines 5—5 in FIG. 1.

A platform 158 is secured to the support column 154 for rotation therewith. The platform 158 includes longitudinal rails 160 and cross supports 162. Angled supports 164 are also joined between the longitudinal rails 160 and the support column 154 to further secure the platform 158 to the support column 154. Referring to FIG. 1, the mast 22 includes longitudinal guide rails 166 formed on an outer surface and extending along the length of the mast 22 from an upper end to a lower flange 167 (FIG. 5). The longitudinal guide rails 166 face outwardly and are received by two sets of cam follower assemblies 168A and 168B. Each of the cam follower assemblies 168A and 168B includes four cam followers 170 spaced-apart from each other at equal angular intervals. Each cam follower 170 includes four rollers 172 that receive the longitudinal guide rails 166.

A drive assembly 176 rotates the platform 158, the support column 154 and the mast 22. The drive assembly 176 includes a suitable drive motor 178 and reducer 180 having an output pinion gear 182. The pinion gear 182 mates with a ring gear 184 secured to the fixed base 152.

Figure 10:
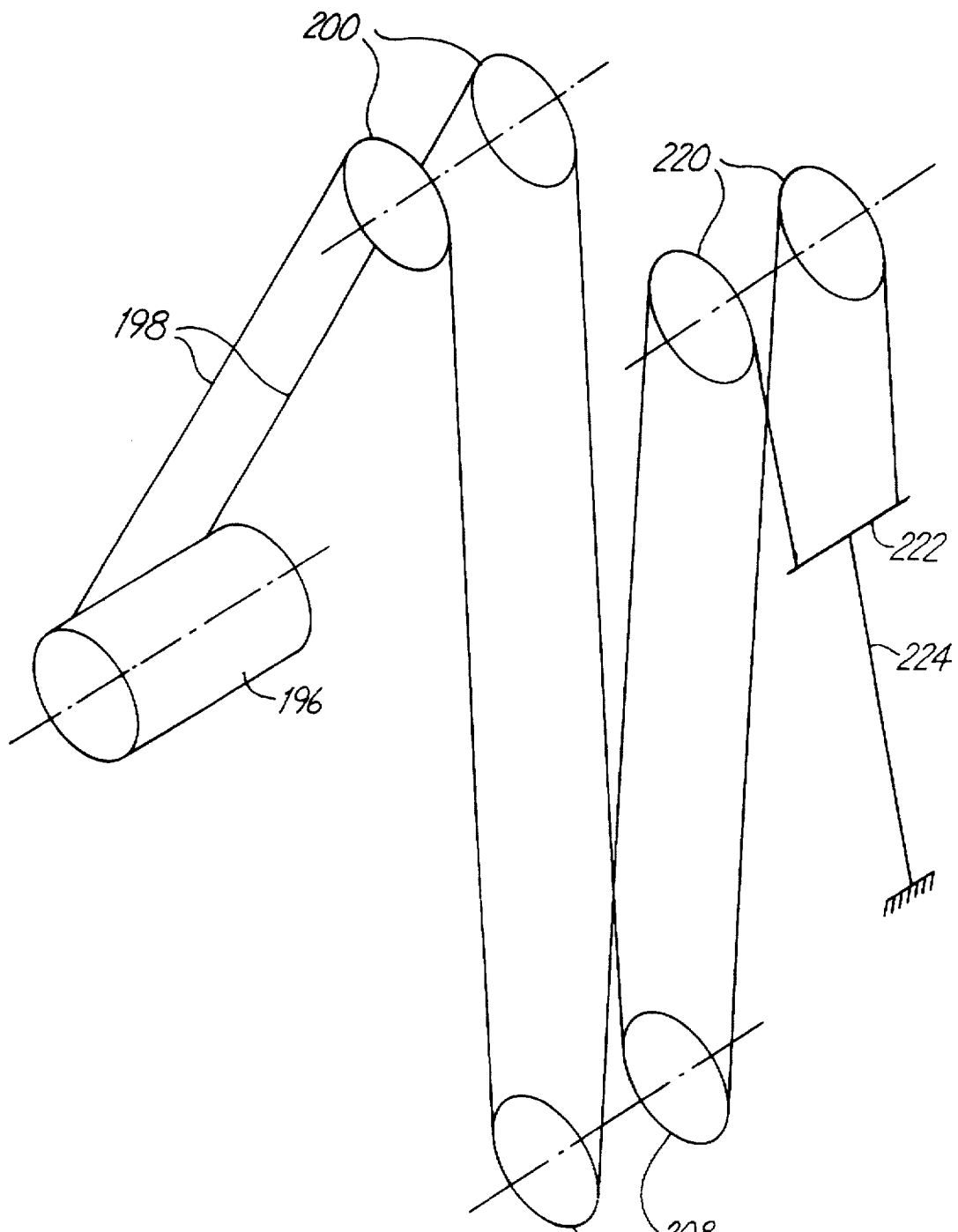
FIG. 10 is a schematic diagram of lift cables.

A second drive assembly 190 raises and lowers the mast 22 as desired. The drive assembly 190 is also mounted to the platform 158 for rotation therewith. The drive assembly 190 includes a motor 192, a reducer 194 and a drive drum 196. Referring also to FIG. 10, lift cables 198 extend from the drive drum 196 to pulleys 200 secured to the upper end of the support column 154. The cables 198 extend from the pulleys 200 into the support column 154 along the outer surface of the mast 22. The cables 198 enter the mast 22 through slots 204 (one of which is illustrated in FIG. 1) and are guided by pulleys 208 disposed within the mast 22. The cables 198 exit the mast 22 through slots 212 (one of which is illustrated in FIG. 1) and extend upwardly along the outer surface of the mast 22 and through the support column 154 to pulleys 220 also mounted at the top of the support column 154. Ends of the cables 198 are secured to a crossbar 222. The crossbar 222 pivots on a support rod 224 that is anchored to the platform 158. Rotation of the drive drum 196 raises or lowers the pulleys 208 and thus the mast 22. The cam follower assemblies 168A and 168B maintain vertical alignment of the mast 22 along the axis 32 as well as rotate the mast 22 when the platform 158 is rotated.

Although the present invention has been described with reference to preferred embodiments, workers skilled in the art will recognize that changes may be made in form and detail without departing from the spirit and scope of the invention.

What is claimed is:

1. A manipulator system for insertion through an opening into a tank to perform work therein, the manipulator system comprising:

an elongated mast having a mast axis, a sidewall, a lower end insertable into the tank opening, and an opening in the sidewall at the lower end;

a telescoping tube assembly having a tube axis, the telescoping tube assembly comprising:
   an outer tube section; and
   an inner tube section coupled to the outer tube section for only telescoping movement relative to the outer tube section;
a hinge joining the telescoping tube assembly to the lower end of the elongated mast;
an actuator joined to the elongated mast and the outer tube section for pivotally moving the outer tube section from a first position, wherein the tube axis is parallel to the mast axis and the telescoping tube assembly is retracted, to a second position, wherein the tube axis intersects with the mast axis and the inner tube section is deployable; and
an end effector joined to a remote end of the inner tube section such that the end effector is receivable into the elongated mast through the opening in the sidewall when the inner tube section is retracted in the second position.

2. The manipulator system of claim 1 and further comprising means for pivoting the end effector such that the end effector is positionable perpendicular to the tube axis.

3. The manipulator system of claim 2 wherein the means for pivoting comprises actuator means for rotational movement of the end effector about an axis perpendicular to the tube axis.

4. The manipulator system of claim 3 wherein the actuator means rotates the end effector about the tube axis.

5. The manipulator system of claim 1 wherein each tube section includes a U-shaped housing having two spaced apart edges and a rigid support plate of thickness greater than the U-shaped housing joined to the spaced apart edges to form a tube, the rigid support plate being parallel to the tube axis; and guide means joining each of the support plates for facilitating telescopic movement of the inner tube section parallel to the outer tube section, the guide means making contact and guiding only the rigid support plate of the inner tube section relative to the rigid support plate of the outer tube section.

6. The manipulator system of claim 5 wherein the telescoping tube assembly includes a second inner tube section located within the first-mentioned inner tube section, the second inner tube section also comprising a U-shaped housing having spaced apart edges and a rigid support plate of thickness greater than the corresponding U-shaped housing; and second guide means joining the rigid support plate of the first-mentioned inner tube section with the rigid support plate of the second inner tube section for facilitating telescopic movement of the second inner tube section parallel to the first-mentioned inner tube section, the second guide means making contact and guiding only the rigid support plate of the second inner tube section relative to the rigid support plate of the first-mentioned inner tube section, and wherein the end effector is joined to a remote end of the second inner tube section.

7. The manipulator system of claim 1 and further including a flexible conduit for carrying signal lines to the end effector from the elongated mast, the flexible conduit being secured at a first end to the outer tube section and being secured to the remote end of the inner tube section to travel therewith, the flexible conduit being disposed on an outer surface of the outer tube section.

8. The manipulator system of claim 1 wherein the outer tube section further comprises a first outer tube end and a second outer tube end, and wherein the remote end of the inner tube moves telescopically away from the first and second ends of the outer tube, and wherein the end of the elongated mast is pivotally coupled to the first outer tube end.

* * * * *